United States Patent
Amundson et al.

(10) Patent No.: US 6,351,585 B1
(45) Date of Patent: Feb. 26, 2002

(54) THERMALLY ADJUSTABLE OPTICAL FIBER GRATING DEVICE WITH PACKAGING FOR ENHANCED PERFORMANCE

(75) Inventors: Karl R. Amundson, Cambridge, MA (US); Benjamin John Eggleton, Summit, NJ (US); Rebecca Jane Jackman, Boston, MA (US); John A. Rogers, New Providence; Thomas Andrew Strasser, Warren, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/241,460

(22) Filed: Feb. 2, 1999

Related U.S. Application Data

(63) Continuation-in-part of application No. 09/183,048, filed on Oct. 30, 1998, now Pat. No. 6,275,629.

(51) Int. Cl.[7] .................................................. G02B 6/34
(52) U.S. Cl. ............................................. 385/37; 385/10
(58) Field of Search ....................................... 385/37, 10

(56) References Cited

U.S. PATENT DOCUMENTS

| | | | | |
|---|---|---|---|---|
| 5,159,601 A | * | 10/1992 | Huber | 372/6 |
| 5,367,589 A | | 11/1994 | MacDonald et al. | 385/37 |
| 5,502,782 A | * | 3/1996 | Smith | 385/7 |
| 5,671,307 A | * | 9/1997 | Lauzon et al. | 385/37 |
| 5,757,540 A | * | 5/1998 | Judkins et al. | 359/341 |
| 5,987,200 A | * | 11/1999 | Fleming et al. | 385/37 |
| 6,011,886 A | * | 1/2000 | Abramov et al. | 385/37 |

FOREIGN PATENT DOCUMENTS

| | | |
|---|---|---|
| EP | 0 770 890 A | 5/1997 |
| EP | 0 867 736 A | 9/1998 |
| JP | 08286040 | 11/1996 |
| JP | 10221658 | 8/1998 |
| WO | WO 98/59267 | 12/1998 |

OTHER PUBLICATIONS

Limberger, H.G., et al., Efficient Miniature Fiber–Optic Tunable Filter Based On Intracore Bragg Grating and Electrically resistive Coating, IEEE Photonics Technology Letters, U.S., IEEE Inc., New York, vol. 10, No. 3, Mar. 1, 1998, pp. 361–363.

* cited by examiner

Primary Examiner—John D. Lee
Assistant Examiner—Jennifer Doan
(74) Attorney, Agent, or Firm—Lowenstein Sandler PC

(57) ABSTRACT

This invention is predicated upon applicants' discovery that the performance of thermally adjustable fiber grating devices is enhanced by disposing them within a vessel for thermal isolation. The vessel is sufficiently larger than the fiber to avoid contact with the grating yet sufficiently small to isolate the grating from substantial air currents. Conveniently, the vessel is a cylindrical tube having elastomeric end seals. Advantageously microcapillary tubes passing through the elastomeric seals provide openings for the fiber to pass through the tube.

7 Claims, 2 Drawing Sheets

THERMALLY ADJUSTABLE OPTICAL FIBER GRATING DEVICE WITH PACKAGING FOR ENHANCED PERFORMANCE

CROSS REFERENCE TO RELATED APPLICATION

This is a continuation-in-part of U.S. patent application Ser. No. 09/183,048, filed by B. Eggleton et al. on Oct. 30, 1998 (now U.S. Pat. No. 6,275,629) and entitled "Optical Grating Devices With Adjustable Chirp."

FIELD OF THE INVENTION

The present invention relates to thermally adjustable optical fiber grating devices, and, in particular, to such devices packaged for enhanced performance.

BACKGROUND OF THE INVENTION

Optical fibers are key components in modern telecommunication systems. Basically, an optical fiber is a thin strand of glass capable of transmitting optical signals containing a large amount of information over long distances with very low loss. In its simplest form, it is a small diameter waveguide comprising a core having a first index of refraction surrounded by a cladding having a second (lower) index of refraction. Typical do optical fibers are made of high purity silica with minor concentrations of dopants to control the index of refraction.

Optical gratings are important elements for selectively controlling specific wavelengths of light within optical systems such as optical communication systems. Such gratings include Bragg gratings and long period gratings. Gratings typically comprise a body of material and a plurality of substantially equally spaced optical grating elements such as index perturbations, slits or grooves. The ability to dynamically modify these gratings would be highly useful.

A typical Bragg grating comprises a length of optical waveguide, such as optical fiber, including a plurality of perturbations substantially equally spaced along the waveguide length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conventionally fabricated by doping a waveguide core with one or more dopants sensitive to ultraviolet light, e.g. germanium or phosphorous, and exposing the waveguide at spatially periodic intervals to a high intensity ultraviolet light source, e.g. an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

In conventional Bragg gratings the dispersion and reflective properties are static. Each grating selectively reflects only light in a narrow bandwidth centered around $m\lambda = 2n_{eff}\Lambda$, where $m=1,2,3\ldots$ is the order of the grating.

However for many applications, it is desirable to have gratings which can be controllably altered in center wavelength, bandwith and/or dispersion.

Long-period fiber grating devices provide wavelength dependent loss and may be used for spectral shaping. A long-period grating couples optical power between two copropagating modes with very low back reflections. It typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating. Long-period gratings are particularly useful for equalizing amplifier gain at different wavelengths of an optical communications system. See, for example, U.S. Pat. No. 5,430,817 issued to A. M. Vengsarkar on Jul. 4, 1995.

Thermally adjustable optical fiber gratings are promising elements for optical communication systems. Electrically controlled heating elements in thermal contact with the fiber vary the fiber temperature, producing variations in both the index of refraction and the spacing between successive perturbations. The heating can be uniform along the length of the grating to adjust the center wavelength or it can vary along the grating to adjust the bandwidth and/or dispersion of the grating. Optical grating devices with thermally adjustable bandwidth are described, for example, in the aforementioned U.S. patent application Ser. No. 09/183,048, now U.S. Pat. No. 6,275,629, which is incorporated herein by reference.

In several important optical communications applications near ideal grating performance is critical. For example, potential applications using thermally adjustable gratings for dispersion compensation require a linear response. Conventional adjustable gratings exhibit instabilities and nonuniform heating which fall short of the performance needed for critical applications. Accordingly there is a need for enhancing the performance of thermally adjustable gratings.

SUMMARY OF THE INVENTION

This invention is predicated upon applicants' discovery that the performance of thermally adjustable fiber grating devices is enhanced by disposing them within a vessel for thermal isolation. The vessel is sufficiently larger than the fiber to avoid contact with the grating yet sufficiently small to isolate the grating from substantial air currents. Conveniently, the vessel is a cylindrical tube having elastomeric end seals. Advantageously microcapillary tubes passing through the elastomeric seals provide openings for the fiber to pass through the tube.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for illustrating the concepts of the invention and, except for the graphs, are not to scale.

DETAILED DESCRIPTION

This description is divided into two parts: Part I describes a thermally adjustable grating device packaged for enhanced performance, and Part II presents the theoretical underpinnings of the enhanced performance.

I. The Packaged Device

Figure 1:
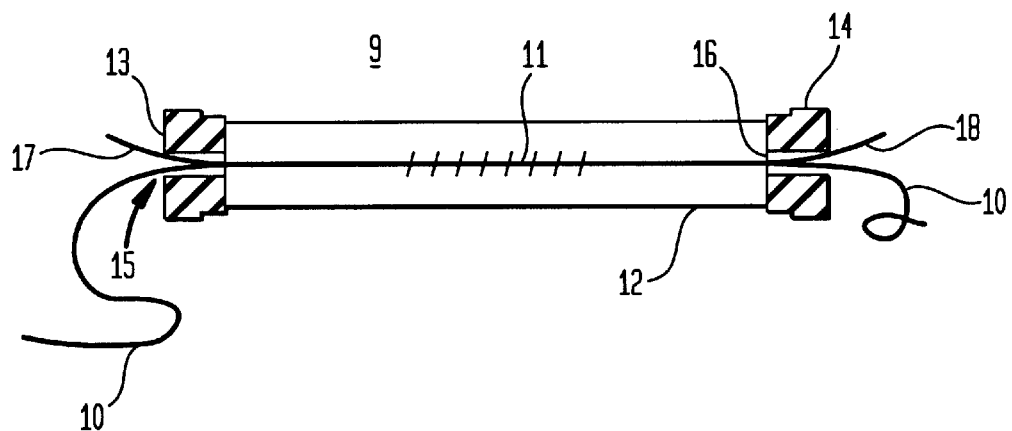
FIG. 1 is a schematic cross section of an improved packaging arrangement for a thermally adjustable optical fiber grating device.

Referring to the drawings, FIG. 1 illustrates a packaging arrangement 9 wherein a length of fiber 10 including a thermally adjustable grating 11 is disposed within a vessel 12 for thermal isolation such as a cylindrical tube. The vessel 12 is sufficiently larger in diameter than the fiber to be spaced from the fiber and thus avoid contact with the grating and yet is sufficiently small in diameter to avoid substantial ambient air currents in the region of the grating. Typically the vessel is less than 5 cm in inside diameter and preferably 1 cm or less. Advantageously the vessel 12 is sealed at both ends by elastomeric stoppers 13, 14. It is believed that the vessel could be advantageously coated with a heat reflective coating.

Advantageously, microcapillary tubes 15, 16 passing through elastomeric stoppers 13, 14 respectively, provide openings for the fiber 10 to pass through the vessel 12. Wires 17, 18 can also pass through tubes 15, 16 to permit connection of grating heating elements (not shown) with an electrical source.

Figure 2:
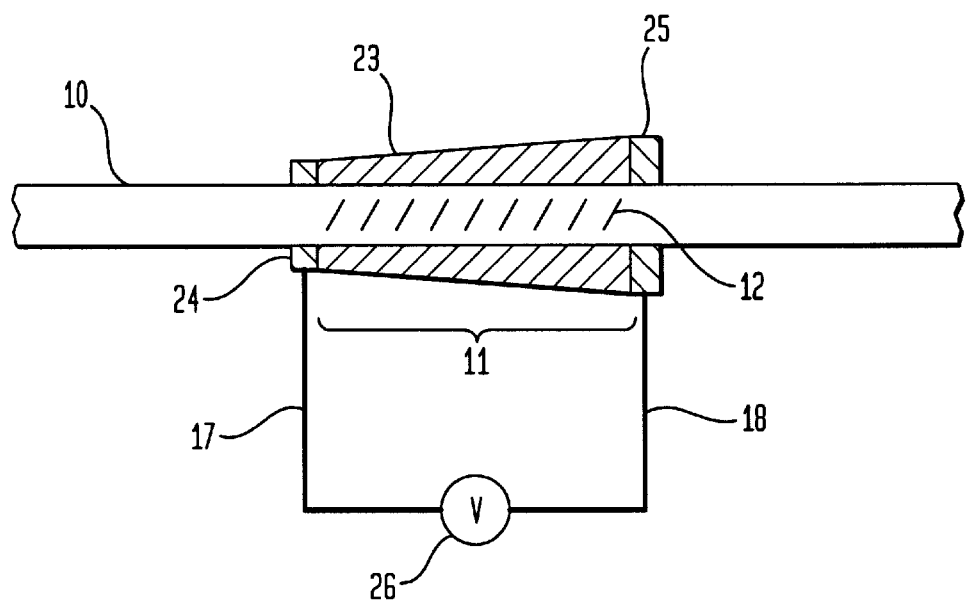
FIG. 2 is a schematic cross section of an exemplary thermally adjustable grating useful in the embodiment of FIG. 1.

FIG. 2 illustrates an exemplary thermally adjustable grating 11 useful in the embodiment of FIG. 1. The grating 11 comprises a sequence of index perturbations 22 in fiber 10. The grating 11 is disposed in thermal contact with an electrically controllable heat-transducing body 23, which can be a heat-generating body or a body which actively removes heat. The body 23 is typically a heat-generating body such as a resistive film on the fiber. The body 23 can be uniform in resistance along the grating 11 to provide uniform heating of the grating and thus permit adjustment of the grating center wavelength. Alternatively, the body 23 can vary in local resistance along the grating to provide different heating at different local regions of the grating and thereby permit adjustment of the grating bandwidth. A pair of electrodes 24, 25 provides electrical contact with wires 17, 18 from an electrical source 26.

The invention may now be better understood by consideration of the following specific example.

EXAMPLE

A fiber containing a conventional apodized Bragg grating is provided with a uniform metal coating of 6000 Å Au/50 Å Ti overlying the grating. The device is packaged as depicted in FIG. 1 with a package comprising a thin polyethylene tube (1 cm dia.) with silicone rubber seals on its ends. The tube extended 2 cm beyond either end of the grating. Glass microcapillary tubes inserted in holes in the rubber seals allow the fiber to be inserted into the plastic tube. Electrical connection to the fiber is made near the rubber seals. Passing current through the metal coating causes Joule heating of the fiber. Primarily through the thermo-optic effect, this heating causes a shift peak of the Bragg resonance.

The package performs several important functions (i) it reduces the rate of heat flow from the fiber to the surroundings, thereby increasing the efficiency of the devices, (ii) it reduces temporal jitter of the reflection peak that arises from uncontrolled, time dependent flow of heat from the fiber to the surroundings and (iii) it eliminates variations in temperature that can arise from spatially non-uniform heat flow out of the fiber. The temporal tuning stability and repeatability, preservation of spectral characteristics, and low power consumption are significantly better than those of previously reported gratings that use a similar design, but do not incorporate the thermal isolation package.

Figure 3:
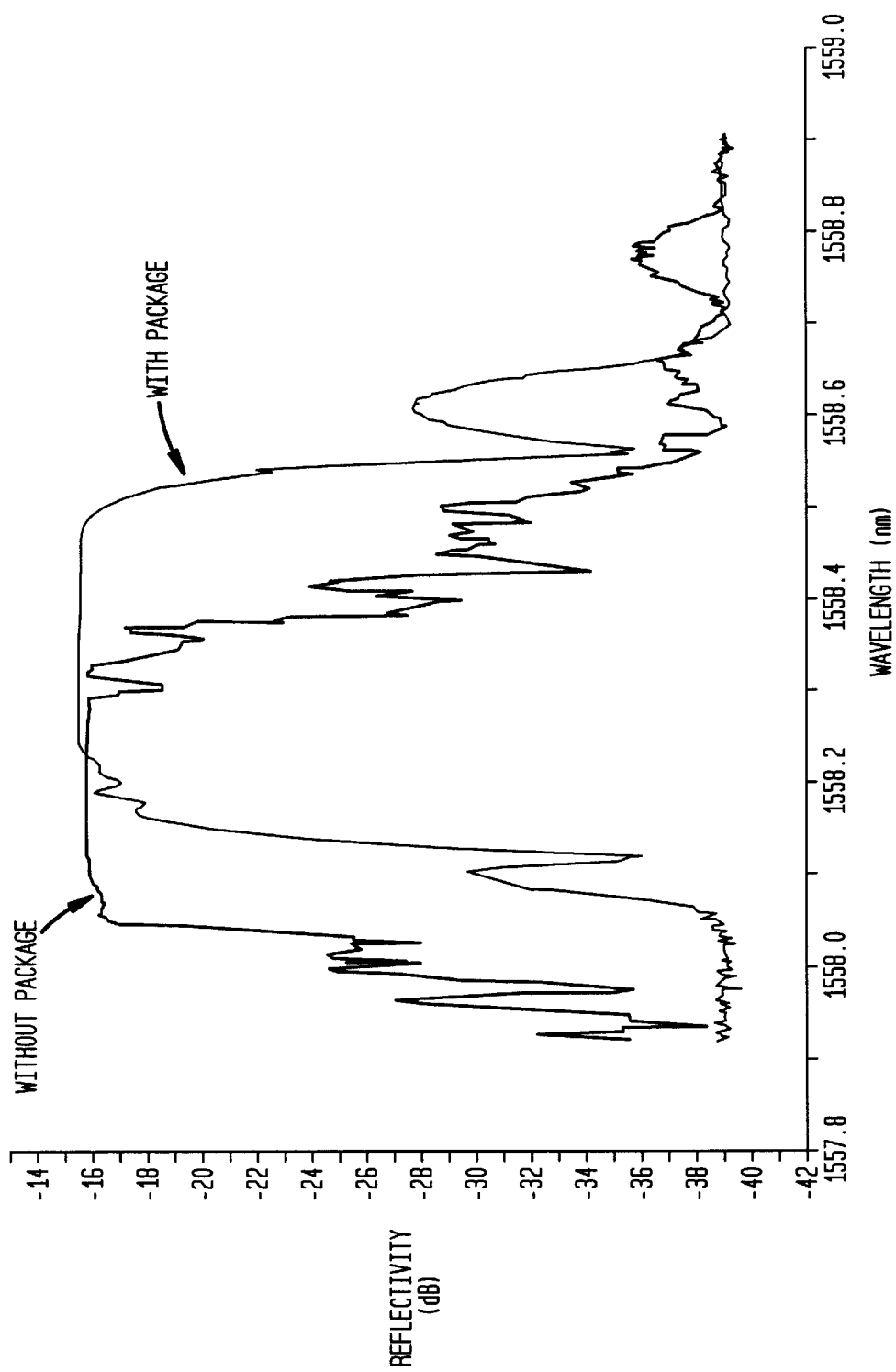
FIG. 3 is a graphical illustration comparing the reflection spectra of packaged and unpackaged Bragg gratings.

FIG. 3 is a graphical illustration comparing the reflectivity spectrum of the above described packaged thermally adjustable grating with that of an unpackaged similar thermally adjustable grating (both are operated at an applied voltage of 2.5 V). As can be seen, the grating with the package has a characteristic more closely approximately the ideal, particularly at the long wavelength edge.

II. Theoretical Considerations

Heat transport from a heated optical fiber device can occur through three modes: radiation, conduction, and convection. Convection arises from movement of the medium in contact with the fiber device, typically air. It is desirable to minimize convective heat transport for several reasons. First, convection can strongly augment heat transport. Secondly, convection can add significantly to temporal variations in the device performance. For example, if the velocity of air flowing around the fiber device changes, so will the rate of heat transport away from the fiber. This will change the temperature profile of the device and degrade the device stability. Convection can also lead to instabilities when flow is turbulent.

To understand the sensitivity of heat transport away from the fiber on external flow, consider the simple case of air flow across a fiber in a direction transverse to the fiber axis. The convective heat transport coefficient is found to obey the engineering relationship:

$$Nu = \frac{hD}{k} = C Re^n Pr^{1/3}$$

where Re is the Reynolds number $$Re = \frac{\rho v_\infty D}{k}$$

and Pr is the Prandtl number $$Pr = \frac{c_p \mu}{k}$$

where the density ($\rho$), viscosity ($\mu$), conductivity (k) and heat capacity ($c_p$) are properties of the surrounding air and $v_\infty$ is the velocity of air far from the fiber. D is the fiber diameter.

The constants C and n obtained from empirical studies have been reported and are published in "Basic Heat Transfer" by Frank Kreith and William Z. Black (Harper & Row Publishers, New York, 1980) on page 251. They are shown here for various ranges of Reynolds numbers:

| Re | C | n |
|---|---|---|
| 0.4–4 | 0.989 | 0.330 |
| 4–40 | 0.911 | 0.385 |
| 40–4000 | 0.683 | 0.466 |
| 4,000–40,000 | 0.193 | 0.618 |
| 40,000–400,000 | 0.0266 | 0.805 |

For air at around 20° C. and 1 atm pressure moving at a constant velocity transverse to the fiber axis, with device diameter of 200 mm, the Nusselt number for various air velocities are given by:

$v$=10 cm/s: Re=1.3, $Pr$=0.71 $Nu$=0.96

$v$=100 cm/s: Re=13, $Pi$=0.71 $Nu$=2.2

$v$=100 cm/s: Re=130, $Pr$=0.71 $Nu$=17

The Prand1 number is reported as 0.71. All these values come from Krieth & Black, p. 520. One can see that the rate of heat loss, which depends on the Nusselt number, changes strongly with the flow rate of air across a device, and approximately as the ⅓ to ½ power of the velocity of air far from the fiber. Suppose the rate heat generation at the fiber surface (q) over a length of fiber (L) is a uniform, constant value q/L. Ignoring radiative heat loss for the sake of simplicity, the steady state temperature of the fiber is given by equating the heat generation with the convective heat loss:

$$q/L = \pi Dh(T_f - T_\infty)$$

where Tf is the temperature of the fiber and $T_\infty$ is the ambient temperature far from the fiber. For constant heat generation, the temperature rise over ambient scales inversely with the convective heat transfer coefficient:

$$T_f - T_\infty = \frac{q/L}{\pi Dh} = \frac{q/L}{\pi k Nu}$$

and therefore the temperature rise is sensitive to the velocity of air flow over the fiber, scaling inversely with the air velocity to roughly the negative ⅓ to ½ power.

In the absence of an externally-driven flow, convection can still occur due to flow induced by heating of the air around the fiber. This type of convection is called natural or free convection and it arises because the wanner air around the fiber is less dense than the cooler air further from the fiber, so the warmer air near the fiber will experience a bouyancy force drawing it upward. An important parameter to characterize free convection is the Grashof number (Gr), which is the ratio of the bouyancy to shear forces;

$$Gr = \frac{\beta g \rho^2 (T_f - T_\infty) L^2}{\mu^2}$$

(pp. 25–261 in Krieth & Black) where β is the coefficient of volume expansion of the surrounding:

$$\beta = \frac{1}{v}\left(\frac{\partial v}{\partial T}\right)_p$$

v is the volume of the fluid, and the derivative is taken at constant pressure. L is a relevant length scale determined by the geometry, and g is the acceleration of gravity. Correlations between the Nusselt number and the Grashof and Prand1 numbers are often given. Also, the product of the Nusselt number and the Prand1 number is often used. This product is called the Rayleigh number:

$$Ra = NuPr$$

In an open environment, even the smallest temperature difference between the fiber and the surroundings will cause free convection. This free convection is undesirable because it increases the heat loss from the fiber and thus the energy required to achieve a desired temperature. Also, it will be quite sensitive to environmental conditions such as the location of nearby objects.

Both forced and free convection can be eliminated by proper packaging of the optical fiber device into an enclosed space. By enclosing the fiber device the fiber is protected against forced convection. Also, at low Grashof numbers the bouyancy force is not sufficient to overcome shear force associated with flow in the enclosure and so natural convection is also eliminated. (For a discussion of free convection in enclosed spaces see Krieth and Black, pp. 261–262.)

As an example, Kreith and Black give correlations for an air space between two vertical plates separated by a distance b and with a temperature difference DT. The Nusselt number is unity for Gr<2000 for a correlation from a study by M. Jacob (M. Jacob, "Free Heat Convection Through Enclosed Plane Gas Layers," Trans. ASME, vol. 68, pp. 189–94, April 1946.). A study by Emery and Chu gives a Nusselt number of unity for Rayleigh numbers less than 1000 (A. Emery and N. C. Chu, "Heat Transfer Across Vertical Layers," J. Heat Transfer, vol. 87, no. 1, pp. 110–116, 1965.) A Nusselt number in these planar geometries (where the appropriate length scale is taken to be the inter-plane spacing) of unity is saying that there is no convection and that heat transport is purely conductive. At higher Grashof numbers, both studies report Nusselt numbers greater than unity, indicating convective heat transport.

The important point from these studies is that for small Grashof or Rayleigh numbers there is no free convection in confined spaces. Consider now a packaging of the fiber device in a coaxial cylindrical geometry. Let b be the radius of the enclosing case minus the radius of the fiber. Free convection will induce a flow with a velocity gradient over a length scale b, so b is the appropriate length scale to use in the Grashof number:

$$Gr = \frac{\beta g \rho^2 (T_f - T\infty) b^2}{\mu^2}$$

Based upon the just-cited studies of free convection in enclosed spaces, it is expected that free convection will not occur for Grashof numbers less than the order of $-2 \times 10^3$. One can estimate the minimum enclosure diameter required to eliminate free convection by equating the Grashof number to this value. Properties of dry air at room temperature are:

β=3.41×10$^{-1}$/K

ρ=1.16 kg/M$^3$

μ=18.3×10$^{-6}$N s/m$^2$

The device will be heated about 100 K above ambient in typical usage. Equating Gr to $1-2 \times 10^3$ gives a value of b of ~3–6 mm, or an enclosure diameter on the order of a centimeter. This is a realizable diameter for a commercial device. The fiber device can easily be packaged in a cylinder of that size or even somewhat smaller.

To guard against convection under more stringent conditions one could pack the space between the fiber device and the surrounding material with a foam or aerogel or other material of low thermal conductivity. The small size of the air gaps in such materials reduces convection to an even greater extent.

It is to be understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. A packaged thermally adjustable optical fiber grating device comprising:

a thermally adjustable optical fiber grating comprising a length of optical fiber, a grating comprising a plurality of substantially equally spaced grating elements along a length of said fiber, and an electrically controllable heating or cooling element in thermal contact with said grating, the element comprising a resistive coating on the fiber along the grating;

said grating disposed within a vessel having an inside diameter less than 5 centimeters but sufficiently larger than said fiber to avoid contact with said grating.

2. The packaged grating of claim 1 wherein said vessel has an inside diameter of 1 centimeter or less.

3. The packaged grating of claim 1 wherein said vessel comprises a cylindrical tube.

4. The packaged grating of claim 3 wherein said cylindrical tube is sealed with elastomeric stoppers.

5. The packaged grating of claim 4 wherein said elastomeric stoppers include microcapillary tubes permitting entrance and exit of said fiber into said cylindrical tube.

6. The packaged grating of claim 1 wherein said resistive coating has substantially uniform resistance along the length of the grating.

7. The packaged grating of claim 1 wherein said resistive coating varies in local resistance along the length of the grating to adjust the grating bandwidth.

* * * * *